United States Patent [19]

Gilbert

[11] 4,000,233
[45] Dec. 28, 1976

[54] TWO-STAGE APPLICATION OF ANTISTATIC AGENTS TO PARISONS

[75] Inventor: Dixie E. Gilbert, Orangeburg, N.Y.

[73] Assignee: Phillips Petroleum Company, Bartlesville, Okla.

[22] Filed: Apr. 16, 1975

[21] Appl. No.: 568,463

[52] U.S. Cl. ............................ 264/89; 264/90; 264/99; 264/131; 264/150; 264/173; 264/237

[51] Int. Cl.² .................................. B29C 17/07

[58] Field of Search ............ 264/94, 98, 99, 150, 264/173, 90, 134, 89, 178 R, 92, 234, 131, 130, 211, 237

[56] References Cited

UNITED STATES PATENTS

| 3,296,063 | 1/1967 | Chandler | 264/211 |
|---|---|---|---|
| 3,400,116 | 9/1968 | Boeke | 264/338 |
| 3,504,075 | 3/1970 | Williams, Jr. et al. | 264/130 |
| 3,541,196 | 11/1970 | Gilbert | 264/99 |
| 3,546,745 | 12/1970 | Ball | 425/71 |
| 3,580,735 | 5/1971 | Shimodoi et al. | 264/136 |
| 3,775,524 | 11/1973 | Seefluth | 264/98 |

*Primary Examiner*—Jeffery R. Thurlow

[57] ABSTRACT

A first antistatic composition is applied to a molten, freshly extruded thermoplastic tube prior to passing same into a sizing means, and thereafter a second antistatic composition is applied to said tube after same has passed through said sizing means and solidified.

10 Claims, 1 Drawing Figure

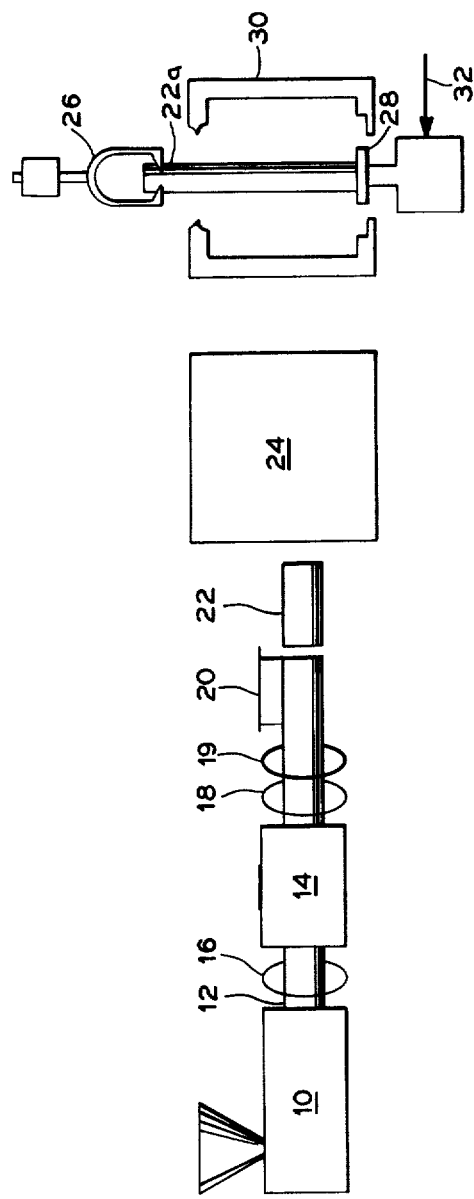

TWO-STAGE APPLICATION OF ANTISTATIC AGENTS TO PARISONS

BACKGROUND OF THE INVENTION

The use of antistatic agents to prevent buildup of static charges on polymeric surfaces is well known. As is so often the case, the use of these materials requires a compromise between competing effects. For instance, an effective concentration on the surface of an article can make that surface sticky. Also some of the best antistatic agents are what is known as "internal" agents, that is, agents which are designed to be compounded into the resin as opposed to being coated onto the surface of the finished article. These agents generally do not produce an immediate effect, but rather require as much as three days or more to migrate to the surface. In addition, having the antistatic agent in the polymer during compounding and extrusion frequently causes color problems.

It is known to apply an antistatic agent by coating the inside of a mold in a conventional blow molding operation as is shown in Boeke, U.S. Pat. No. 3,400,116 (1968).

There has recently been developed a technique for producing biaxially oriented hollow articles such as bottles from reheated parison preforms. These preforms are produced by extruding a continuous length of tubing which is cut into individual lengths. It has been found that prior art techniques for eliminating static charges are not entirely satisfactory with these biaxially oriented articles. For instance, if the coating is applied to the molten extrudate immediately upon extrusion, prior to entering the sizing sleeve, much of the material is lost in the water bath which is conventionally used downstream from such a sizing sleeve. If the material is applied to the finished parison, it has been found that the agent does not adhere well enough and can be easily removed by abrasion partly because of the presence of lubricant generally employed during the sizing of the tubing and also because the agent is only loosely held on the surface of the parison. If the antistatic agent is incorporated into the polymer, there is the normal problem of color formation during compounding and extrusion and the additional problem of static buildup during the time the parisons are reheated and formed into the final product.

SUMMARY OF THE INVENTION

It is an object of this invention to provide biaxially oriented hollow articles having improved resistance to static accumulation;

it is a further object of this invention to avoid the problem of discoloration, stickiness, and the like associated with the use of antistatic agents; and it is still a further object of this invention to provide an antistatic system which is immediately effective so as to allow sequential processing of parison preforms immediately after forming, if desired.

In accordance with this invention, a first antistatic composition is applied to a molten, freshly extruded thermoplastic tube prior to passing same to a sizing means, and thereafter a second antistatic composition is applied to said tube after same is passed through said sizing means and solidified.

BRIEF DESCRIPTION OF THE DRAWING

The drawing is a schematic representation of apparatus for carrying out the process of this invention.

DESCRIPTION OF THE PREFERRED EMBODIMENTS

The invention is applicable to the production of parisons from any extrudable plastic polymer for which antistatic protection may be required. Exemplary polymers are nylon, polyolefins, polystyrene, polyvinyl chloride, and the like. More preferably the invention is directed toward the production of parisons from polymers of at least one mono-1-olefin having 2 to 8 carbon atoms per molecule, most preferably polypropylene.

The antistatic agent can be either an amine, a quaternary ammonium compound, an anionic compound, or any other material known in the art as being useful for dissipating static charges and combinations thereof. Both antistatic agents which are known to be useful as internal additives and agents known to be useful as coating materials can be utilized, although the invention is of particular utility in utilization of antistatic agents which are considered in the art as being suitable for use as an internal additive as opposed to a coating material. Exemplary amines are N,N-bis(2-hydroxyethyl)alkylamine (alkyl radicals containing 12–18 carbon atoms per radical) sold under the trade name Armostat 410. Exemplary quaternary ammonium compounds are stearyltrimethylammonium chloride sold under the trade name Adogen 449 and methyl alkyl bis(2-hydroxyethylammonium p-toluenesulfonate), the alkyl group having 4–18 carbon atoms per group, sold under the trade name 106G; similar compounds wherein the alkyl has halogen or aryl substitution can also be used. An exemplary anionic compound is a free acid of a complex organic phosphate ester sold under the trade name Gafac RD-510. Presently preferred is a combination of N,N-bis(2-hydroxyethyl)alkylamine and methyl alkyl bis(2-hydroxyethylammonium p-toluenesulfonate) wherein the weight ratio of amine to sulfonate varies from about 0.2:1 to about 5:1.

The antistatic agent utilized in the first composition can be either the same as or different from the antistatic agent utilized in the second composition.

In one embodiment, the second composition contains 25 to 150 weight percent based on the weight of the second antistatic agent of an acrylic polymer. Exemplary acrylic polymers are normally solid emulsion polymerized acrylic copolymers comprising any combination of methyl methacrylate, ethyl acrylate, butyl acrylate, 2-ethylhexyl acrylate, as well as small amounts of acrylic acid, methacrylic acid, or acrylonitrile. Solids content of such emulsions or solutions made from such emulsions range from about 20 to about 60 percent. Preferably the first composition does not contain any acrylic polymer. Where the tubing is to be immediately severed into individual work pieces and passed to an oven for heating to orientation temperature, a suitable catalyst (i.e., organic peroxide) and either an acrylic monomer or a low molecular weight acrylic polymer which will polymerize in the oven can be used in place of the normally solid acrylic polymer. Preferably, however, the normally solid acrylic polymer is a film-forming polymer having a glass transition temperature $t_G$ ranging from about −20° to +105° F.

The antistatic compositions can be admixed with any suitable diluent. Surprisingly, with tubing of a hydrophobic material such as polypropylene, an aqueous diluent has been found to be entirely satisfactory. Generally, the concentration of antistatic agent will be within the range of 1 to 10 weight percent based on the weight of the diluent. In the preferred instances where water is the diluent, 0.02 to 0.2 weight percent of a surface active agent such as Aerosol OT which is the dioctyl ether of sodium sulfosuccinic acid, Triton X 405 which is an alkylaryl polyether alcohol, or SC-170, a fluorocarbon wetting agent from 3M Co. are utilized in the first composition.

The first composition is applied to the outside of the molten extrudate preferably in an amount sufficient to give a matrix, i.e., a continuous or at least interconnected weblike coating. Generally, from 0.01 to 1 gram of antistatic agent per square meter of surface area is applied, more preferably from 0.02 to 0.08 gram per square meter. This first composition can be applied by any means found in the art such as dripping, spraying and the like. The thus-coated freshly extruded molten tube then passes to a sizing means such as a sleeve of the type shown in Ball, U.S. 3,546,745 (1970), the disclosure of which is hereby incorporated by reference.

The second composition is applied to the outside of the extrudate after it has passed through the sizing means. Generally, it will have also passed through a water cooling means but will not necessarily be cooled down to room temperature. Generally, it will be in the range of 120° to 185° F. when the second composition is applied. The amount applied will be from 0.01 to 1 gram composition per square meter of surface area.

Surprisingly, the second composition substantially improves the resistance of the extrudate to static accumulation presumably because of the presence of the first composition which is absorbed into the hot molten fresh extrudate and/or worked into the extrudate near the surface thereof during passage through the sizing means. In addition, the first composition serves in lieu of silicone lubricant which is generally applied prior to passage through the sizing means. The second composition is applied by a spray gun utilizing high pressure small nozzle with no air such as a Graco ring spray, or by swabbing or painting such that a uniform, continuous coat is achieved. Following the coating operation the extrudate is dried by passage over a semicircular electric heater, through a heat tunnel or the like. The heating step is important since it allows the coat to penetrate the surface, thus the final coated article is resistant to loss of agent by abrasion, rubbing, scuffing and the like.

Referring now to the drawing, there is shown an extruder 10 for forming a fresh molten tubular extrudate 12 which passes to vacuum sizing and cooling chamber 14 which can be identical to the water bath containing the sizing sleeve as shown in said Ball patent. First spray means 16 is provided to apply the first antistatic composition to said molten extrudate prior to entering the sizing means of cooling chamber 14. On passing through cooling chamber 14 immediately after coming out of the water bath portion thereof, second spray means 18 sprays the second antistatic composition onto the thus-solidified but still warm tube. Heating means 19 serves to evaporate solvent used in coating the tube. A tube heated to a temperature of 350°–500° F. (176°–260° C.) is satisfactory. Cutting means 20 severs the thus-treated tube into individual cylindrical parison preforms or work pieces 22. These are then transferred into oven 24 where they are heated to molecular orientation temperature (generally 1°–50° F. below the melt point for crystalline polymer), thereafter transfer means 26 transfers said parison to position over an internal plug within thread-forming means 28. Transfer means 26 then moves up, thus stretching the parison longitudinally to its condition as depicted by reference character 22a. Thereafter, mold halves 30 close on the parison and air is introduded via line 32 to expand same out into conformity with the mold wall to form a biaxially oriented hollow article such as a bottle.

EXAMPLE

Normally solid polypropylene having a melting point of about 171° C. and a melt flow of about 4 as determined by ASTM D1238-62T, Condition L, was extruded in the form of a tube at a melt temperature of about 400°–425° F. (about 204°–218° C.) which was vacuum sized by means of said Ball patent. The extrusion rate was 12.5 feet per minute. Onto the molten tube, prior to its entry into the sizing ring, was sprayed or dropped about 1.1 cc per minute of a composition consisting of 3 weight percent of methyl alkyl bis(2-hydroxyethylammonium p-toluenesulfonate) wherein the alkyl group had from about 4 to about 18 carbon atoms per group commercially available as 106G, Fine Organics, Inc., and 2 weight percent of N,N-bis(2-hydroxyethyl)alkylamine commercially available as 273, Fine Organics, Inc., wherein the alkyl group had from 12–18 carbon atoms per group dissolved or dispersed in 95 weight percent water. The amount of material (dry basis) coating the tube was about 0.052 per square meter. The coated extrudate was passed to the sizing ring where the coating was worked into the plastic surface as it was chilled into a form stable tube having a diameter of 33 millimeters.

The tube passed through a water bath and was cooled to an average temperature of about 130°–150° F. (about 54°–65° C.) and thence was passed to a coating station where an antistatic composition identical to and at the same application rate as the first application was wiped onto the warm tubing. The coated tubing was passed directly over a semicircular heated tube about 18 inches long which was at a temperature of about 450° F. (232° C.) and thence to the pipe puller unit. The heat treatment insured that the water evaporated from the composition and that the composition itself had the opportunity to enter the matrix surface resulting from the first application of antistatic formulation to the molten extrudate. The coated tubing was passed to a cutting unit where it was severed into parison preforms of about 8 inches in length.

The parisons were transferred to a heating oven where they were heated to about 330° F. and converted into biaxially oriented, substantially clear bottles.

The bottles were tested with a Static Meter, Keithley Instruments, Cleveland, Ohio. As received from the mold, the bottles had a zero reading indicating no charge was present. Rubbing the bottles with a cloth to induce a charge was fruitless, the meter indicating this by a zero reading. Ordinary handling and transportation methods did not generate any charge over a period of several months at various humidity and temperatures.

When the second coating step was omitted, the bottles possessed a zero reading when received from the mold but were charged by rubbing with a cloth and gave values ranging from about 1 to about 12 kilovolts. Such bottles would be expected to pick up dust and dirt by the charge induced by handling and ordinary treatment.

While the invention has been described in detail for the purpose of illustration, it is not be be construed as limited thereby but is intended to cover all changes and modifications within the spirit and scope thereof.

What is claimed is:

1. A process comprising forming a molten tubular extrudate; coating a first antistatic composition onto a surface of said extrudate; sizing said extrudate and cooling same to a solid condition; thereafter coating a second antistatic composition onto said surface; and thereafter heating to dry the thus-coated extrudate.

2. A method according to claim 1 wherein said molten extrudate is sized by passing same through a cylindrical sizing sleeve without the use of a silicone lubricant and thereafter through a water bath.

3. A method according to claim 1 wherein said second antistatic composition contains an acrylic polymer.

4. A method according to claim 1 wherein said thermoplastic is polypropylene and said first and second antistatic compositions comprise 1–10 weight percent antistatic agent in water.

5. A method according to claim 1 wherein said first and second antistatic compositions each comprise an antistatic agent which is a mixture of a N,N-bis(2-hydroxyethyl)alkylamine and a methyl alkyl bis(2-hydroxyethylammonium p-toluenesulfonate) wherein the weight ratio of said amine to sulfonate is within the range of 0.2:1 to about 5:1, water, and a surface active agent.

6. A method according to claim 1 wherein said first composition is applied in an amount sufficient to give 0.01 to 1 gram of antistatic agent per square meter of surface area, and said second composition is applied in an amount sufficient to give 0.01 to 1 gram of antistatic agent per square meter of surface area.

7. A method according to claim 6 wherein said second antistatic composition contains 25 to 150 weight percent of an acrylic polymer based on the weight of said antistatic agent.

8. A method according to claim 7 wherein said tube is at a temperature of 120°–185° F. on application of said second antistatic composition.

9. A method according to claim 8 wherein said second antistatic composition is sprayed from a small high pressure nozzle without the use of air.

10. A method according to claim 1 wherein said tubular extrudate, after said second antistatic agent is applied, is cut into a parison preform, reheated to orientation temperature and thereafter stretched longitudinally and expanded out into conformity with a molding zone to produce a biaxially oriented hollow article.

* * * * *